US011476010B2

(12) United States Patent  
Sidorov et al.

(10) Patent No.: US 11,476,010 B2  
(45) Date of Patent: Oct. 18, 2022

(54) COOLING METHOD FOR REACTOR MOLTEN CORE MELT AND COOLING CONTROL SYSTEM FOR REACTOR MOLTEN CORE (71) Applicants: Joint-stock company "Atomenergoproekt", Moscow (RU); Joint Stock Company "Science and Innovations", Moscow (RU)

(72) Inventors: Aleksandr Stalevich Sidorov, Moscow (RU); Nadezhda Vasilevna Sidorova, Moscow (RU)

(73) Assignees: JOINT STOCK COMPANY "ATOMENERGOPROEKT", Moscow (RU); JOINT STOCK COMPANY "SCIENCE AND INNOVATIONS", Moscow (RU)

( * ) Notice: Subject to any disclaimer, the term of this patent is extended or adjusted under 35 U.S.C. 154(b) by 0 days.

(21) Appl. No.: 16/627,741

(22) PCT Filed: Dec. 28, 2018

(86) PCT No.: PCT/RU2018/000897  
§ 371 (c)(1),  
(2) Date: Dec. 30, 2019

(87) PCT Pub. No.: WO2020/091623  
PCT Pub. Date: May 7, 2020

(65) Prior Publication Data  
US 2021/0358648 A1    Nov. 18, 2021

(30) Foreign Application Priority Data

Nov. 1, 2018 (RU) .......................... RU2018138641

(51) Int. Cl.  
*G21C 9/016* (2006.01)  
*G21C 15/18* (2006.01)  
(Continued)

(52) U.S. Cl.  
CPC ............. *G21C 15/18* (2013.01); *G21C 9/016* (2013.01); *G21C 17/00* (2013.01); *G21C 17/112* (2013.01);  
(Continued)

(58) Field of Classification Search  
CPC ....... G21C 9/016; G21C 17/112; G21C 17/00  
See application file for complete search history.

(56) References Cited

FOREIGN PATENT DOCUMENTS

CN         106651217 A   *   5/2017  
RU         2576516 C1    *   3/2016      ............. G21C 9/016

* cited by examiner

Primary Examiner — Jack W Keith  
Assistant Examiner — Joshua C Devorkin  
(74) Attorney, Agent, or Firm — J. Miguel Hernandez; James R. Gourley; Carstens & Cahoon, LLP (57) ABSTRACT The invention relates to safe operation support systems of nuclear power plants (NPPs) at severe accidents, including methods and systems for cooling and cooling control of the reactors molten core. The invention increases safety of NPP and cooling efficiency of the molten core of a reactor. The invention increases the efficiency of cooling the molten core of a reactor by safely removing the heat load from the molten metal mirror, ensuring the elimination of vapor explosions. The invention changes the principle of cooling the reactor molten core, in that after the molten core destroys the reactor vessel, the conditions for subsequent cooling of the molten metal are determined by the characteristics of the trap casing, but not of the reactor.

2 Claims, 3 Drawing Sheets

(51) Int. Cl.
  *G21C 17/112* (2006.01)
  *G21C 19/04* (2006.01)
  *G21C 17/00* (2006.01)
  *G21C 9/00* (2006.01)
  *G21C 19/313* (2006.01)
(52) U.S. Cl.
  CPC ............. *G21C 19/04* (2013.01); *G21C 9/001* (2013.01); *G21C 19/313* (2013.01)

COOLING METHOD FOR REACTOR MOLTEN CORE MELT AND COOLING CONTROL SYSTEM FOR REACTOR MOLTEN CORE

CROSS-REFERENCE TO RELATED APPLICATIONS

This application is a US 371 application from PCT/RU2018/000897 filed Dec. 28, 2018, which claims priority to Russian Application No. 2018138641 filed Nov. 1, 2018, the technical disclosures of which are hereby incorporated herein by reference.

The invention relates to safe operation support systems of nuclear power plants (NPPs) at severe accidents, in particular, to methods and systems for cooling and cooling control of the reactors molten core.

Damage to the reactor core occurs in a severe accident at NPP, as a result of which the molten metal enters the lower part of the reactor vessel, and, in turn, destroys it. Destruction of the reactor vessel can lead to undesirable consequences, for example, to complicate the control procedure of the distribution and physical chemical behaviour of the molten metal. Volatile and aerosol forms of radioactive decay products diffuse into containment, posing a threat to its integrity, leak out and cause radioactive contamination of the area. In order to reduce these negative consequences significantly and to eliminate beyond-design dose loads to the population and the environment, modern nuclear power plants are usually equipped with molten metal traps installed under the reactor, thus after the bottom part of the reactor is melted, the molten metal falls into the trap, in which its localization and cooling occurs.

Usually, in order to cool the molten metal, coolant (water) is introduced into the molten metal trap.

Temperature sensors are installed above the trap to control the molten metal flow after the destruction of the reactor vessel, for example, thermocouples, which are used to control the temperature of the molten metal flow and its position after the destruction of the reactor.

The water should be supplied to the molten metal in the reactor vessel, or outside it, taking into account to avoid vapour explosion inside the containment, however, when mixing water with a molten metal during jet flow of water from above onto the molten metal, or pouring the molten metal mixed with the molten oxides in water located in the pressure chamber of the reactor, during the melting of the crusts surrounding the pool of the molten metal formed inside the core during the melting of the fuel elements, it is impossible to exclude destructive vapour explosions as the molten metal jets dispersing in water and reacting the dispersed jet and concurrent flows with the surfaces of equipment in the pressure chamber of the reactor or with the inner surface of the bottom of the reactor vessel provide, in practice, the ideal conditions for maximum release of energy accumulated by molten metal.

To avoid vapour explosion, the surface of the molten metal (molten metal mirror) is usually not immediately cooled, it is usually cooled after receiving information about the state of the molten metal. Certain molten metal traps are designed in a similar way with the sacrificial material placement inside the trap. After a certain time, the components of the sacrificial material rise above the melt to prevent a steam explosion, or in the melt during the chemical interaction with the sacrificial material, the oxide and metal components are inverted, in which the oxide components of the melt rise up and the metal ones fall down, thereby creating favourable conditions for supplying water to the surface of the molten metal (on its oxide components). Certain designs of traps use a special discharge tank to discharge and distribute the molten metal, which allows the molten metal to spread over a large area with a relatively thin layer, and jet cooling (spraying) of the molten metal without the risk of vapour explosions. Water is supplied, in this case, only if the molten metal completely spreads inside the trap, otherwise, for example, if the molten metal spreading mode is violated and it accumulates over a limited area, thermal and chemical destruction of the base of the trap is possible, or conditions for a vapour explosion appear in the supply mode of cooling water on the top of the molten metal.

After the melting of the reactor vessel, the issue of supplying water to it is no longer considered.

In certain NPP designs, the reactor vessel is filled with water until the reactor vessel is melted. Filling with water occurs at the stages of core destruction, the flow of molten core from the core to the bottom of the reactor vessel, the accumulation of molten metal on the bottom of the reactor vessel, up to the destruction of the bottom. This procedure is very dangerous. The reason for this is a vapour explosion, developing both when water is mixed with liquid metals and mixed with liquid oxides, which are never available in the molten metal in pure, only in a mixture with a certain amount of liquid metals.

On the other hand, there is uncertainty with the supply of cooling water to the reactor vessel due to the lack of information about the location of the molten metal inside the reactor vessel. Thus, the water supply to the reactor vessel does not guarantee its safety.

The reactor control system measures the neutron flux outside the reactor vessel, monitors changes in the reactivity of the core, power changes, and other parameters during normal operation, failures in normal operation, during design and beyond design accidents without destroying the reactor core. This system is not specifically designed to monitor severe accidents at NPP, in which certain factors, such as the location change of the elements of the core and its solid fragments, the location change of the elements of the internals, as well as location change and volume of the molten core inside the reactor vessel, change of chemical composition and phase state, including the formation of sludge (two-phase solid-liquid state) and stratification, a change in its thermal and mechanical state, lead to a significant distortion and change in the data on the physical parameters of the core both inside and outside the reactor vessel.

The cooling method [1] for the reactor molten core is known from the prior art, which consists in determining the location of the molten core fragments in the reactor vessel and determining the state of the molten core, after the destruction of the reactor vessel by the molten core, according to information received from temperature sensors installed in the reactor, the supplying of coolant to the reactor core, taking into account the information received, increasing or decreasing the volume of coolant supplied to the core after the reactor vessel melting, supplying coolant in a reactor core based on the actual location and the state of the molten elements of the reactor core.

A system for implementing the method [1] is known from the prior art, comprising a first group of temperature sensors installed above the reactor core, a second group of temperature sensors installed on the outside of the reactor vessel, a third group of temperature sensors installed on the bottom of the reactor vessel, a fourth group of temperature sensors installed in the area between the trap and the bottom of the reactor vessel, connected to control equipment.

One of the drawbacks of the method, as well as the system intended for its implementation, is that at temperatures above 1100° C., the active oxidation of zirconium begins with the hydrogen release. The temperature in this process rises rapidly from 1200° C. to 1800-2200° C. and above. This leads to the destruction of temperature sensors installed inside the reactor vessel, and, in particular, allows only the moment of the beginning of the destruction of the core to be determined and the area, in which the destruction process is faster to be localized, based on data on temperature increase and data on sensor failures. Temperature sensors installed inside the reactor vessel above the core will indicate the temperature of the vapour-gas medium during a certain period (temperature of the mixture of vapour and hydrogen), distorted by the circulation processes in the core. These sensors for quite a long time can show a quite acceptable temperature due to the specific features of the design of the core, which allows the vapour-gas mixture to circulate through several, almost independent, peripheral channels, which leads to a significant underestimation of the average temperature of the vapour-gas mixture above the core in comparison with a similar temperature in the channels.

Another drawback of the method, as well as the system intended for its implementation, is that the temperature sensors installed on the outer surface of the reactor vessel do not allow to determine the state of the core due to the thermal inertia of the reactor vessel and distortion of temperature fields caused by the internal reactor processes, associated with combined-cycle convection, core melting, reradiation, and other thermal and chemical and thermal and hydraulic processes. Thus, temperature sensors installed on the outer surface of the reactor vessel detect certain changes, but this information is clearly not enough to determine the state of the core and, especially, the state of the molten metal, without involving additional data on the parameters of the media in the primary circuit and in the containment zone.

Therefore, external control of the state of the core in the reactor vessel is not an independent control, and cannot function separately.

As a result, due to the lack of reliable information about the state and location of the molten metal inside the reactor vessel, it becomes impossible to cool the molten metal by supplying cooling liquid (water) to the reactor vessel, since this can lead to vapour explosion and destruction of not only the reactor vessel, but also the containment, which as a result will lead to the release of radioactive fission products beyond the boundaries of the NPP site.

The technical result of the claimed inventions is to increase the safety of NPP, cooling efficiency of the molten core of a reactor.

The objective of the claimed inventions is to increase the efficiency of cooling the molten core of a reactor by safely removing the heat load from the molten metal mirror, ensuring the elimination of vapour explosions leading to the destruction of the localization area of accidents, the reactor cavity and the containment.

The objective is solved due to the fact that the cooling method of the molten core of a reactor, which consists in determining, after destruction of the reactor vessel by molten core, the location of the molten core debris and determining the state of core penetration by the information received from temperature sensors, cooling liquid supply, increasing or decreasing the volume of coolant supply, according to the invention, after destruction of the reactor vessel by the molten core, the degree of destruction of the reactor vessel and the start time of the molten metal flowing out of the reactor vessel into the trap is determined, then coolant is supplied into the trap casing with a predetermined time delay, from the inspection chambers of the internal shells and the protective tubes unit of the reactor, after which the conditions for the formation of a sludge cap above the surface of the molten metal mirror are determined, the start time for the formation of a crust on the surface of the molten metal is determined, the completion time of aerosols release is determined, the completion time of vapour sorption and the time of hydrogen formation are determined, the stabilization time of the molten metal cooling processes and the time these processes exit into quasi-stationary mode are determined, then the volume of coolant supply is adjusted taking into account the thermal and physical parameters of the media in the sealed volume of containment, and then the volume of coolant supply is adjusted taking into account the minimum and maximum water levels in the reactor cavity.

The cooling control system for reactor molten core containing temperature sensors connected to control equipment according to the invention also comprises level sensors mounted under the truss panel along the casing of the trap in the area of its external water cooling, while the temperature sensors are divided into the first, the second and third groups, the first group of temperature sensors is installed above the molten metal mirror inside the trap casing, and their working bodies are directed to the mirror, the second group of temperature sensors is installed between the trap casing and the truss panel, the third group of temperature sensors is installed under the guide plate, all temperature sensors and level sensors are combined in two channels, and sealed limit switches are installed on the working bodies of each temperature sensor, covered with protective non tight caps.

A distinctive feature and a fundamental difference between the claimed method and the prototype is that when the core is destroyed, the state of the trap is monitored, but not the internal reactor space, which is due to the fact that the reactor vessel as a part (and the entire first circuit as a whole) is closed in relation to the containment of an energy-generating system (strong and dense during normal operation), and the trap is an open energy-generating system built into the containment, which allows as controlling and regulating the containment procedures to ensure effective manipulation of the trap.

The inability to influence by similar procedures on the internal reactor processes from the containment is due to the fact that for any destruction of the primary circuit, up to the maximum design basis accident (with the main circulation pipeline break in full cross-section), the reactor cavity still remains a closed system in relation to the containment, wherein a certain excess residual pressure in the reactor vessel with respect to the pressure in the containment, which does not allow for effective indirect control of the processes inside the reactor vessel by changing the process parameters in the containment.

One distinctive feature of the claimed system is that temperature sensors and level sensors, grouped in two channels, are installed on the trap casing, and not on the reactor casing, which allows for both controlling and regulating actions during cooling of the reactor molten core.

Another distinctive feature of the claimed system is that the temperature sensors are installed at three different levels relative to the molten metal mirror, which ensures that each channel receives equivalent characteristic information.

Another distinctive feature of the claimed system is that all temperature sensors located inside the trap casing, or in areas of direct and indirect action of molten metal, have protective end caps that provide thermal and chemical and gas-dynamic protection of their working bodies.

Another distinctive feature of the claimed system is that all the limit switches of the temperature sensors are installed in protective non tight caps that provide thermal and mechanical antisplash protection or a small amount of molten core, jets of liquid concrete and its fractions, small flying objects and aerosols.

The claimed inventions operate as follows.

Figure 1:
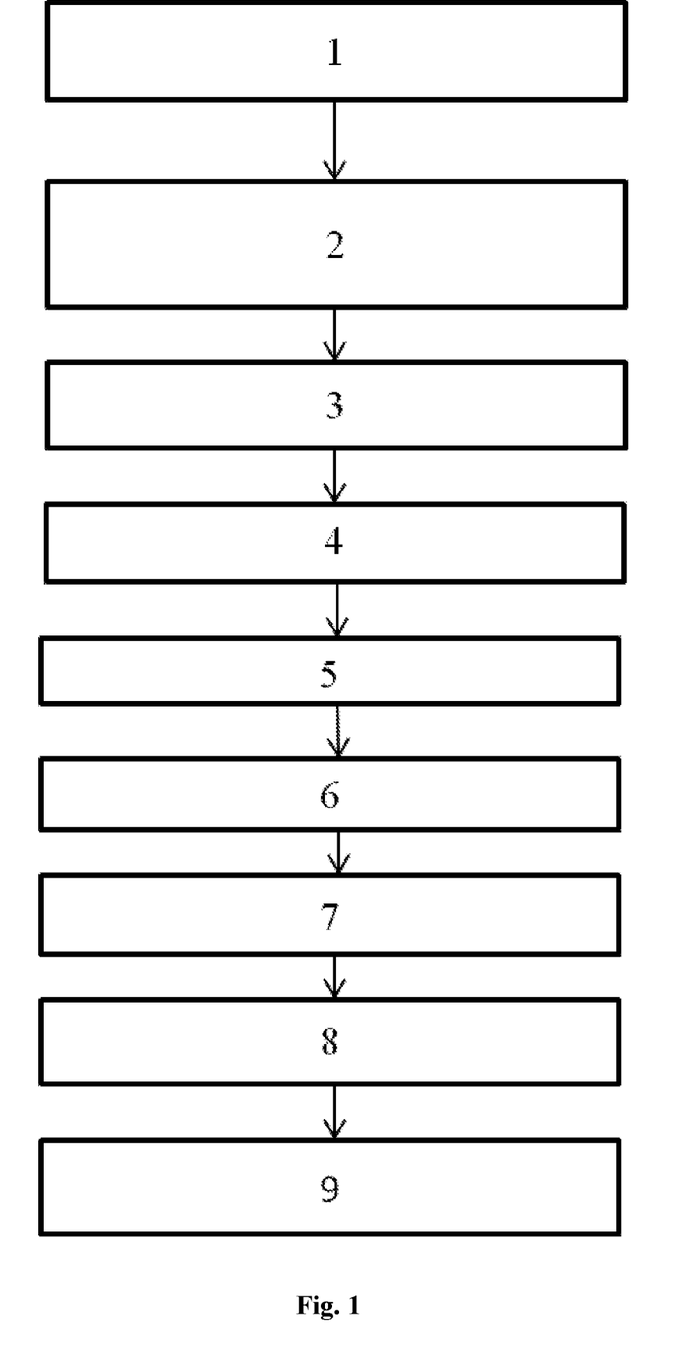
FIG. 1 presents a flowchart of a reactor molten core cooling method.

The process of the reactor molten core cooling consists of several main stages:

determination (1) of the degree of the reactor vessel destruction and the time of the molten metal outflow from the reactor vessel into the trap;

supply (2) of coolant inside the trap casing with a predetermined time delay from the inspection cavities of the internals and the protective pipes unit of the reactor;

determination (3) of the formation conditions of the sludge cap above the surface of the molten metal mirror determination (4) of the start time of the crust formation on the surface of the molten metal;

determination (5) of the completion time of aerosol release;

determination (6) of the completion time of vapour sorption and hydrogen formation;

determination (7) of the stabilization time of the molten metal cooling processes;

determination (8) of the time when these processes reach the quasistationary mode;

increase or decrease (9) in the coolant supply volume, taking into account the thermal and physical parameters of the media in the tight containment volume;

increase or decrease (10) in the coolant supply volume, taking into account the minimum and maximum water levels in the reactor cavity.

The essence of this process is as follows. After the core of the reactor is melted, the molten core begins to flow onto the guide plate and flow down it into the trap. This process is preceded by two events that determine the subsequent control actions: the first is the flow of the first circuit coolant and cooling water from the active and passive systems to the filter premise (in the pit tank) connected with the reactor cavity, where the trap is installed, and the second is heating air and then vapour-gas medium in the internal volume of the trap. The first event, caused, for example, by a rupture of a primary circuit pipeline with subsequent failures of active safety systems and normal operation, or by a rupture of a primary circuit pipeline and a complete blackout of NPP, leads to the outflow of coolant and then cooling water from passive safety systems to a containment volume. This water forms interconnected level in the filter premise and in the reactor cavity around the trap casing, which is sensed by a group of level gauges installed under the truss panel along the trap casing in the area of its external water cooling. Water enters the filter premise and the reactor cavity, through sections connected with it and located at its base. Level gauges sense the appearance of water around the trap casing, while temperature sensors located at three levels show the temperature inside the trap of not more than 400° C. during this period, which is due to the absence of molten core in the reactor vessel. Gradually, cooling water boils out of the reactor vessel, the core heats up, breaks, and melts, flowing down to the bottom of the reactor vessel. But even in this case, the temperature sensors, being below the bottom of the reactor vessel, show a temperature below 400° C., because they are protected by a guide plate and a truss panel. Gas convection from the heated casing is much higher than the location of the temperature sensors in a relatively cold thermostated area, while the temperature in this area is constant due to the quasi-stationary temperature of the water in the filter premise.

When the reactor vessel is broken, the following processes occur: pressure changes in the trap and liquid metals entering with a certain amount of liquid oxides the core catcher at the first stage, while the temperature sensors of the first, second and third groups either heat above 400° C. or are destroyed by the resulting molten metal, that is, are failed. According to two of these signs: overheating of the temperature sensor or failure of the temperature sensor (destruction), (1) the beginning of the molten core inflow from the reactor vessel into the trap is determined. In fact, according to these two signs, the degree of destruction of the reactor vessel is also determined, which, in turn, determines the staging of the molten metal inflow from the reactor vessel into the trap, namely: a) either liquid metals first flow out and then liquid oxides in a while, which indicates the presence of side penetration of the reactor vessel; b) the simultaneous outflow of the entire molten metal in single volume from the reactor vessel, which indicates the destruction of the bottom of the reactor vessel. Both of these conditions are determined by the readings obtained from the temperature sensors of the first, second and third groups, namely:

a) if after the destruction of the reactor vessel the temperature sensors of the first, second and third groups show a temperature of more than 400° C., after which the temperature continues to increase slowly, and in a few hours, for example, 2-3 hours, a rapid increase in temperature occurs, this means that there is a side penetration of the reactor vessel and a two-stage process of molten metal inflow (first liquid metals flow out, then liquid oxides flow out), and, therefore, the water from the cavities of the internals and the protective pipes unit is supplied with a design (predetermined) delay, for example with a delay of three to four hours, providing that the molten metal is dissolved the filler and inversion of corium components occurred (oxides are at the top and metals are on the bottom);

b) if, after the destruction of the reactor vessel, the temperature sensors of the first, second and third groups show a temperature of more than 400° C., after which the temperature immediately begins to rise uniformly or abruptly, this means that there is a one-stage process of molten metal inflow (the molten metal is poured together with the oxides), and therefore, water from the cavities of the internals and the protective pipes unit is supplied earlier in time, approximately within the range from 30 minutes to one hour from the moment the molten metal inflow, as the filler dissolves quickly enough, as well as the inversion of metals and oxides occurs quickly, within about 30 minutes.

Thus, according to the readings of the temperature sensors of the first, second and third groups, a delay timer for the water supply to the molten metal surface from the inspection cavities of the internals and the protective pipes unit of the reactor is turned on, and then (2) coolant is supplied inside the trap casing. The delay time can be set from 30 minutes to 4 hours. The delay time is determined taking into account the duration of the outflow of the oxide part of the molten metal from the reactor vessel (in case of a two-stage jet discharge from the hole in the broken side surface of the reactor vessel). In addition, to set the delay time, as a rule, the volume of sacrificial steel and sacrificial oxides in the filler are taken into account, which are necessary for transferring the high-temperature and chemically aggressive molten core to a stabilized state. This allows cooling the molten metal without destroying the trap casing and without additional destruction of the truss panel and the guide plate by thermal radiation.

An important point in ensuring the passive safety of the molten metal is the inversion of its oxide and metal components, which occurs as the filler melts and dissolves in the molten core melt to a decrease in the density of the oxide part of the molten core with respect to its metal part. As a result of the inversion, the oxide uranium-containing part of the molten metal floats up, and the metal part of the molten metal lowers down. Inversion of the molten metal components allows solving two objectives:

1. to ensure equalization of the heat flux from the molten core through the trap casing to water, in which the initial heat flux distribution with a maximum of unevenness in the area of the molten steel located above the molten metal of oxides is smoothed and aligned by the height of the trap casing after floating of uranium-containing oxides above the molten metal. Alignment of the heat flux after inversion is provided mainly due to the difference in the thermal and physical properties of the molten oxide and the metals.

2. provide direct cooling of the molten metal mirror with water to suppress the aerosol activity of the molten metal and thermal radiation from the mirror to the trap casing equipment located above, to the truss panel and the guide plate holding the bottom of the reactor vessel with fragments of the core and internals.

In the process of interaction between the molten core and the filler, a sludge cap of light filler oxides is generated above the molten metal mirror. The sludge cap reduces the interaction of the open liquid metal surface of the molten metal bath with water vapour generating hydrogen. Additionally, the sludge cap reduces thermal radiation from the side of the molten metal mirror, aimed at the above items of equipment. As the sludge cap cools, a crust is formed on it. The formation of a sludge cap and crust is determined (3) using temperature sensors of the first and second groups, which display periodic temperature fluctuations, namely: if the crust size increases, this leads to a slight decrease in temperature, if the crust breaks, this leads to a sharp increase in temperature due to the release of gases and aerosols. Subsequent water supply to the surface of the molten metal lowers its surface temperature. Operable temperature sensors located at each of the three levels on the trap display data on the temperature decrease after the start of water supply to the molten metal surface from the inspection cavities of the internals and the protective pipes unit. According to such readings of temperature sensors located at three levels (for temperature decrease), they determine (4) the completion time for the aerosol exit, namely: the water entering the molten metal surface blocks the exit of aerosols and thermal radiation, as well as quickly cools the equipment located above, and stabilizes its mechanical characteristics, therefore, this leads to a decrease in temperature.

The time for completion of vapour sorption and hydrogen formation is determined (5) by the readings of temperature sensors located at three levels. These readings coincide with the completion of aerosol release and the beginning of water cooling the molten metal mirror.

Then, according to the readings of all operable temperature sensors, they determine (6) the stabilization time of the molten metal cooling processes and determine (7) the time of transition of these processes to the quasi-stationary mode, namely: if the temperature sensors display a constant temperature with a subsequent decrease in temperature during the gradual cooling of the molten metal, this indicates that there is a process of stable cooling of the molten metal, in which, as the residual energy release decreases, the average temperature of the molten metal decreases, it is fixed and gradually transits from liquid phase to solid.

The remaining molten metal in the bottom of the reactor vessel and the bottom itself are also gradually cooled. Stabilization and temperature decrease are diagnosed by temperature sensors, which are located on the third level and display the temperature of the vapour-gas medium under the guide plate. These readings are affected by heat fluxes from re-radiation from the hot surfaces of the internals of the truss panel and the lower plane of the guide plate, the lower the re-radiations, the lower the temperature of the sensors of the third group, the colder the surface of the truss panel and the guide plate, the lower the temperature the guide plate and the remains of the molten core located on it. According to the readings of the temperature sensors of the third group, the volume of water supply to the trap increases or decreases (8) after the water supply from the inspection cavities of the internals and the protective pipe unit is completed, namely: if, after the water supply from the inspection cavities of the internals and the protective pipe unit stops, the temperature starts increase, then the volume of water supply to the trap casing is increased, if the temperature does not increase, then the water supply to the trap casing is reduced or completely stopped.

According to the readings of the level gauges (13), the volume of water supply is increased or decreased (9) taking into account the minimum and maximum water levels in the reactor cavity. Water levels are related to the levels at which the flange of the trap casing and the base of the truss panel are located, namely: if the water level is lower than the level of the shell flange, then the water supply volume is increased, if the water level is at the level of the base of the truss panel, then water supply into the trap casing is reduced or completely stopped.

Figure 2:
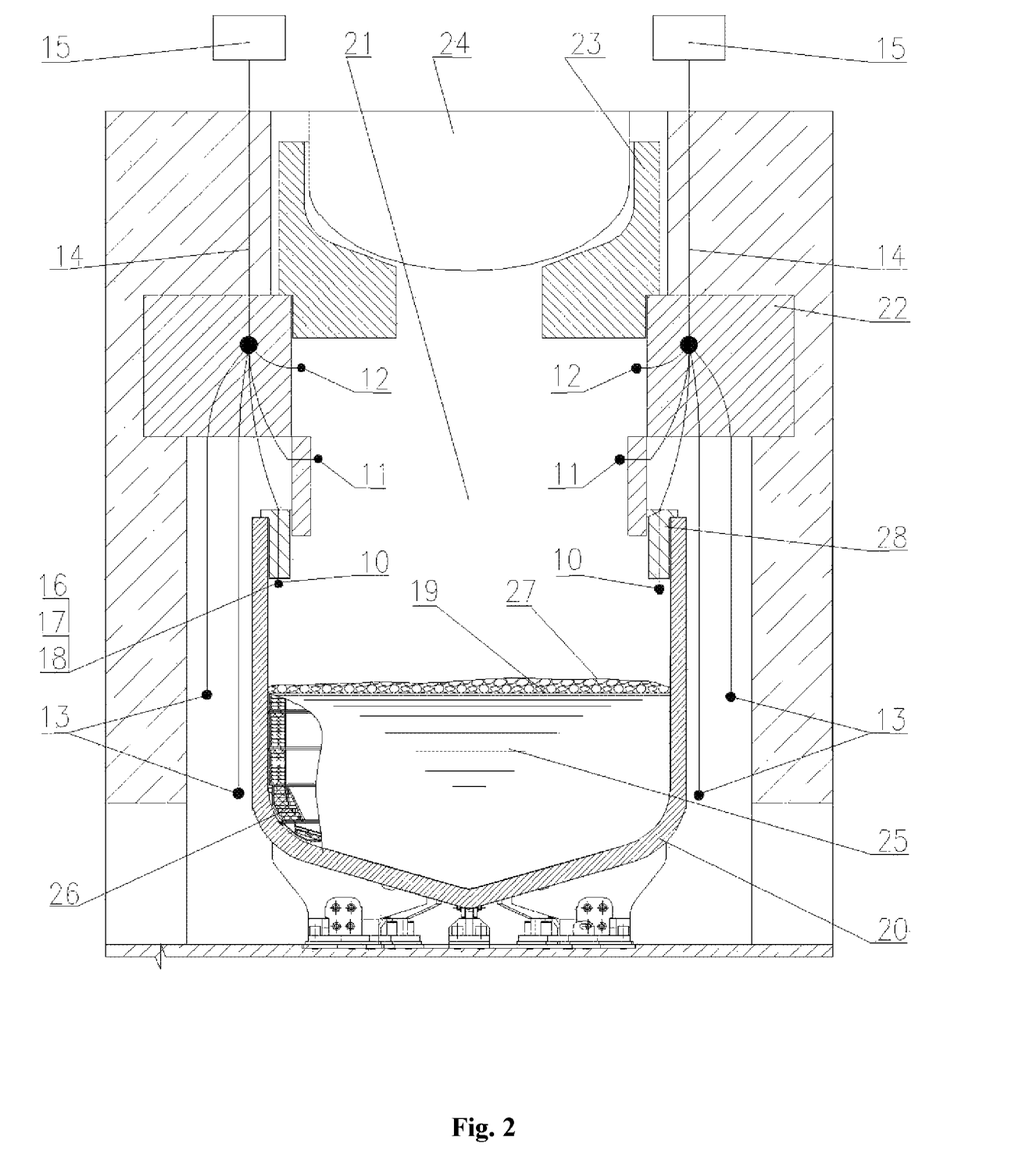
FIG. 2 presents control system of a reactor molten core cooling.
Figure 3:
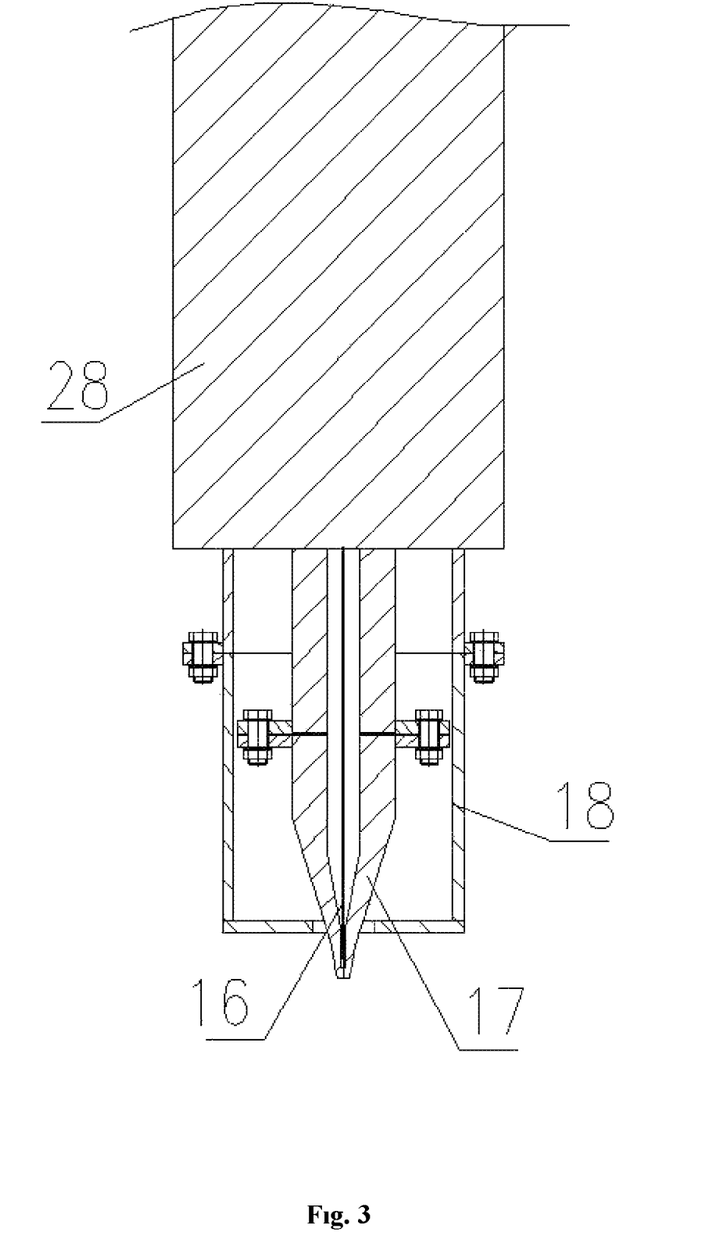
FIG. 3 presents the protection of temperature control sensors—a sealed limit switch and a protective cap.

As can be seen in FIG. 2 and FIG. 3, the reactor molten core cooling control system contains a first, second, third group of temperature sensors (10, 11, 12) and a group of level gauges (13), combined in two channels (14), and connected to the control equipment (15), sealed limit switches (17) are installed on the working bodies (16) of each temperature sensor, closed by protective non tight caps (18), the first group of temperature sensors (10) is installed above the molten metal mirror (19) inside the casing (20) of the trap (21) of the molten metal, and their working bodies (16) are directed to the molten metal mirror (19), the second group of temperature sensors (11) is installed between the casing (20) of the trap (21) and the truss panel (22), the third group of temperature sensors (12) is installed under the guide plate (23), a group of level gauges (13) is installed under the truss panel (22) along the casing (20) of the trap (21) in the area of its external water cooling.

At the moment of the reactor vessel (24) break, the motel core (25), under the influence of hydrostatic and overpressure, begins to enter the internal casing (20) of the trap (21) and comes into contact with the filler (26).

The filler (26) provides volumetric dispersion of the molten corium (25) within the trap (21), and is intended for additional oxidation of the corium and its dilution in order to reduce the volume of energy and increase the heat transfer surface of the energy-generating corium with the outer layer of the trap (21), as well as contributes to the creation of conditions for the fuel-containing fractions of the corium floating above the steel layer. Filler (26) can be made of steel and oxide components containing oxides of iron, aluminium, zirconium, with channels for redistributing the corium not only in the cylindrical part, but in the bottom conical volume.

Steel and oxide components are completed in cylindrical cartridges. Typically, the filler at least comprises a first cartridge mounted on the bottom of the trap casing, a second cartridge located above the first cartridge, and a third cartridge mounted above the second cartridge. The third cartridge, in turn, may consist of several cartridge mounted on top of each other.

In fact, three groups of temperature sensors (10, 11, 12) are installed at three levels, while the first group of temperature sensors (10) is installed inside the casing (20) of the trap (21), and the second and third groups of temperature sensors (11, 12) are installed above the casing (20) of the trap (21).

The first group of temperature sensors (10) located at the closest distance from the molten metal mirror (19) and the sludge cap (27) ensures temperature control. Thermal protection (28) is arranged above these temperature sensors, which provides their protection against the effects of flowing molten metal and flying objects. The working bodies (16) of these temperature sensors (10) are directed towards the molten metal (25). The first group of temperature sensors (10) stops functioning after the formation of a mirror (19) in the casing (20) of the trap (21), since by this moment the thermal radiation from the side of the mirror (19) begins to melt the thermal screen from below (28). Temperature increase of the mirror up to the melting temperature of thermal protection indicates that at this point in time there was a reaction between the bulk of the molten metal and the filler, and besides, there was a transition to a quasi-stationary mode of heat transfer to the coolant through the trap casing, as well as thermal radiation upstream elements of the equipment of the trap (21), truss panel (22) and the guide plate (23).

The second group of temperature sensors (11) installed between the trap casing (20) and the truss panel (22) also provides temperature control. These temperature sensors (11) are located in an area not protected by thermal screens and thermal protection. The second group of temperature sensors (11) operates depending on the nature of the molten core inflow from the reactor vessel into the trap: during rapid non-axisymmetric flow of molten steel, for example, during 30 to 60 seconds, weighing about 60-100 tons, or during slow non-axisymmetric flow of molten liquid oxides in a mixture with a certain amount of molten steel for, for example, 2-3 three hours weighing about 90-130 tons, partial melting (failure) of some temperature sensors of the second group occurs. But certain temperature sensors (11) can continue to operate even after the completion of the axisymmetric outflow of the molten metal from the reactor vessel, as the most difficult for the sensors of the second group to operate. According to the readings of these temperature sensors, one of the most important parameters is determined—the time of the beginning of the reactor vessel bottom destruction, i.e., in fact, the beginning of the molten metal flow, as well as the subsequent state of the vapour-gas medium above the surface of the molten metal, or its crust, are determined. Based on this data, a timer is activated to automatically supply coolant with a predetermined delay. Coolant is supplied from the inspection cavities of the internals and the protective pipe unit into the trap casing to cool the sludge cap and the molten core mirror beneath it.

The third group of temperature sensors (12) installed at the closest distance to the reactor vessel (20) also provides temperature control. These temperature sensors (12) are installed in a protected, cooled area, located under the guide plate (23), and they remain operational throughout the entire time of cooling the molten core in the trap casing. According to the readings of these sensors (12), one of the most important parameters is determined—the time of the beginning of the reactor vessel bottom destruction, i.e., the time of the beginning of the molten metal outflow and the subsequent state of the vapour-gas medium above the surface of the molten metal are actually determined. Based on this data, a timer is activated to automatically supply coolant with a predetermined delay. Coolant is supplied from the inspection cavities of the internals and the protective pipe unit into the trap casing to cool the molten core. Besides, the formation of a sludge cap above the surface of the mirror is recorded according to the readings of these sensors, the start time of the formation of a crust on the surface of the molten metal is determined, information is received on the termination of aerosol release and completion of the process of vapour sorption and hydrogen generation.

A group of level gauges (13), installed at least in two external levels located on the outside of the casing (20) of the trap (21) in the cooling area of the casing (20), provides control of the coolant level in the reactor cavity. This group of level gauges (13) is located in a protected cooled area under the truss panel (22). Based on the readings of the level gauges (13), the level of the reactor cavity filler with water is determined, i.e., these readings confirm the design functioning of the trap cooling system, or the operation of this system is adjusted.

The application of the above method for cooling the reactor molten core and a control system made it possible to increase the efficiency of cooling the reactor molten core by removing the heat load from the mirror, which, in turn, completely eliminated the possibility of a vapour explosion during works on heat removal from the molten metal, and, therefore, to increase the safety of NPP.

REFERENCES

1. PRC Patent No. CN106651217, IPC G21D3/06, priority dated Jun. 1, 2017.

The invention claimed is:

1. A method of nuclear reactor core melt cooling involving a determination, after the core of nuclear reactor vessel is destroyed by melt, of a location of molten core debris and a determination of a core penetration state based on information obtained from temperature sensors, supply of coolant to supply a coolant volume to the melt and adjusting the supply of coolant volume, the method comprising:

after the melt destroys the core of the nuclear reactor vessel, according to the information obtained from the temperature sensors divided into first, second and third groups and installed such that the first group of temperature sensors is located above a melt mirror inside a core catcher body of a core catcher, the second group of temperature sensors is installed between the core catcher body and a cantilever truss, the third group of temperature sensors is installed under a guide plate, wherein all the temperature sensors and level gauges are combined into two channels, performing a first set of steps comprising:

determining a degree of destruction of the nuclear reactor vessel and a start time of leakage of the melt from the nuclear reactor vessel into the core catcher, after the determining the degree of destruction, then supplying the coolant inside the core catcher body with a predetermined time delay from internals inspection shafts and a protective tube unit of the nuclear reactor, after the supplying the coolant, then determining conditions of sludge cap formation on a surface of the melt mirror, determining a start time of crust formation on the surface of the melt mirror, determining a completion time of aerosol release from the melt, determining a completion time of steam sorption by the melt and a time of hydrogen formation, determining a stabilization time of cooling processes of the melt and a time the cooling processes transition to a quasi-stationary mode, after performing the first set of steps, then, according to information received from the level gauges, the level gauges being installed under the cantilever truss along the core catcher body in an area of external water cooling of the core catcher body, performing a second set of steps comprising:

adjusting the coolant volume that is supplied taking into account thermal physical parameters of media within fa pressurized containment volume, and then adjusting the coolant volume that is supplied taking into account minimum and maximum water levels in the reactor cavity.

2. The method of nuclear reactor core melt cooling according to claim 1, the method comprising using a cooling control system for monitoring the nuclear reactor core melt to implement the method, the system comprising:

the temperature sensors connected to control equipment, the level gauges installed under the cantilever truss along the core catcher body in the area of the external water cooling of the core catcher body;

wherein the temperature sensors are divided into the first, second and third groups;

wherein the first group of temperature sensors is installed above the melt mirror inside the core catcher body, and working bodies of the first group of temperature sensors are directed to the melt mirror, the second group of temperature sensors is installed between the core catcher body and the cantilever truss, the third group of temperature sensors is installed under the guide plate, all the temperature sensors and level sensors are combined into two channels, and a working body of each of the temperature sensors has sealed end switches covered with protective non-tight caps.

* * * * *